(12) United States Patent
Molteni

(10) Patent No.: US 7,386,960 B2
(45) Date of Patent: Jun. 17, 2008

(54) MODULAR STRUCTURE FOR MODULAR PARTITION WALLS FORMED OF JUXTAPOSED PANELS

(75) Inventor: Piero Molteni, Milan (IT)

(73) Assignee: Unifor S.p.A., Turate (Como) (IT)

( * ) Notice: Subject to any disclaimer, the term of this patent is extended or adjusted under 35 U.S.C. 154(b) by 459 days.

(21) Appl. No.: 10/410,404

(22) Filed: Apr. 10, 2003

(65) Prior Publication Data

US 2003/0192261 A1 Oct. 16, 2003

(30) Foreign Application Priority Data

Apr. 10, 2002 (IT) .................. MI2002A000771

(51) Int. Cl.
*E04H 1/00* (2006.01)

(52) U.S. Cl. .................. 52/238.1; 52/36.1; 52/243; 52/220.7; 312/111; 312/140; 160/135; 411/389; 211/187

(58) Field of Classification Search ............ 52/238.1, 52/36.1, 241, 243, 239, 220.7, 584.1, 36.5; 211/182, 187–189; 403/384, 388, 299, 286, 403/379.6; 312/111, 140, 257.1; 160/135, 160/351; 446/124, 117; 411/389
See application file for complete search history.

(56) References Cited

U.S. PATENT DOCUMENTS

| | | | | |
|---|---|---|---|---|
| 622,931 | A * | 4/1899 | Sullivan | 280/177 |
| 2,703,724 | A * | 3/1955 | Der Yuen et al. | 403/265 |
| 3,513,606 | A * | 5/1970 | Jones | 52/27 |
| 3,670,899 | A * | 6/1972 | Kronenberg et al. | 211/182 |
| 3,783,801 | A * | 1/1974 | Engman | 211/188 |
| 3,987,836 | A * | 10/1976 | LeMay | 160/135 |
| 4,104,838 | A * | 8/1978 | Hage et al. | 52/239 |
| 4,419,938 | A * | 12/1983 | Kaut | 108/190 |
| 4,536,044 | A * | 8/1985 | Ziegelheim et al. | 312/195 |
| 4,625,476 | A * | 12/1986 | Shimada | 52/126.4 |
| 5,363,625 | A * | 11/1994 | Philippi | 52/653.2 |
| 5,409,122 | A * | 4/1995 | Lazarus | 211/186 |
| 5,431,210 | A * | 7/1995 | Nelson et al. | 160/135 |
| 5,586,593 | A * | 12/1996 | Schwartz | 160/135 |
| 5,676,263 | A * | 10/1997 | Chang | 211/187 |
| 5,993,287 | A * | 11/1999 | Melashenko et al. | 446/478 |
| 6,000,179 | A * | 12/1999 | Musculus et al. | 52/239 |
| 6,128,876 | A * | 10/2000 | Nitschke et al. | 52/239 |
| 6,241,108 | B1 * | 6/2001 | Nakatani et al. | 211/187 |
| 6,244,002 | B1 * | 6/2001 | Martin | 52/220.7 |
| 6,295,764 | B1 * | 10/2001 | Berridge et al. | 52/36.5 |
| 6,351,916 | B2 * | 3/2002 | Militzer | 52/239 |
| 6,493,995 | B2 * | 12/2002 | McKenzie | 52/36.4 |
| 6,536,147 | B1 * | 3/2003 | Funk et al. | 40/605 |
| 6,679,016 | B2 * | 1/2004 | Liu | 52/238.1 |

\* cited by examiner

*Primary Examiner*—Winnie Yip
(74) *Attorney, Agent, or Firm*—Wenderoth, Lind & Ponack, L.L.P.

(57) ABSTRACT

A modular supporting structure is intended to support juxtaposed panels in order to form a modular partition wall adapted to subdivide and define a space to be used as an office into independent working zones. The modular supporting structure comprises a lower cross member, a plurality of intermediate cross members, an upper cross member and a plurality of upright spacers, with each upright spacer interconnecting a pair of adjacently arranged cross members. Only one joining element is provided for interconnection of each intermediate cross member to a pair of lower and upper upright spacers, respectively, at their point of concurrence, in order to form a supporting structure consisting of a framework of rectangular elementary cells intended to frame the juxtaposed panels.

28 Claims, 5 Drawing Sheets

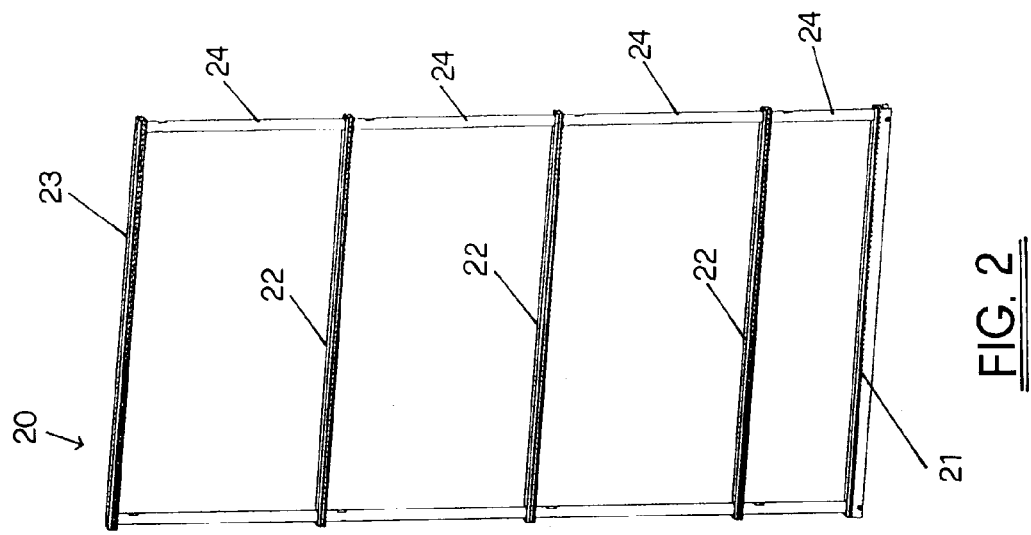
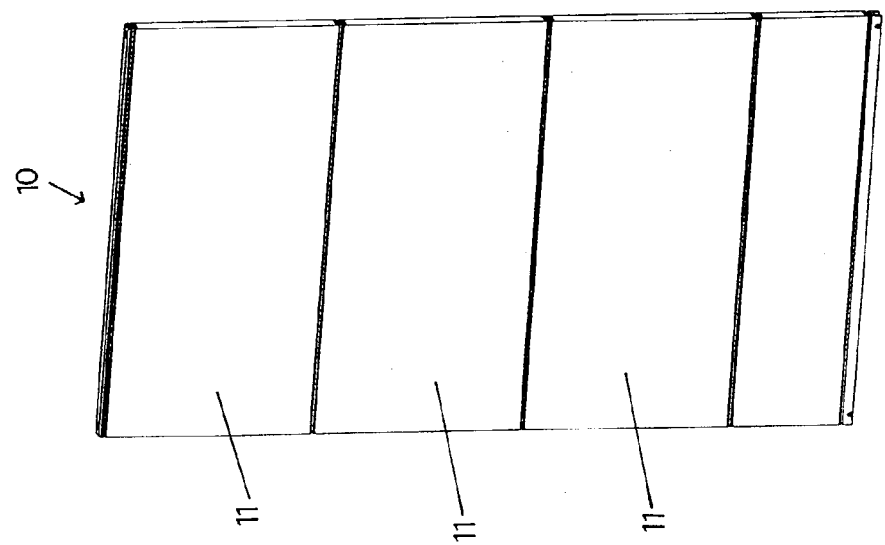

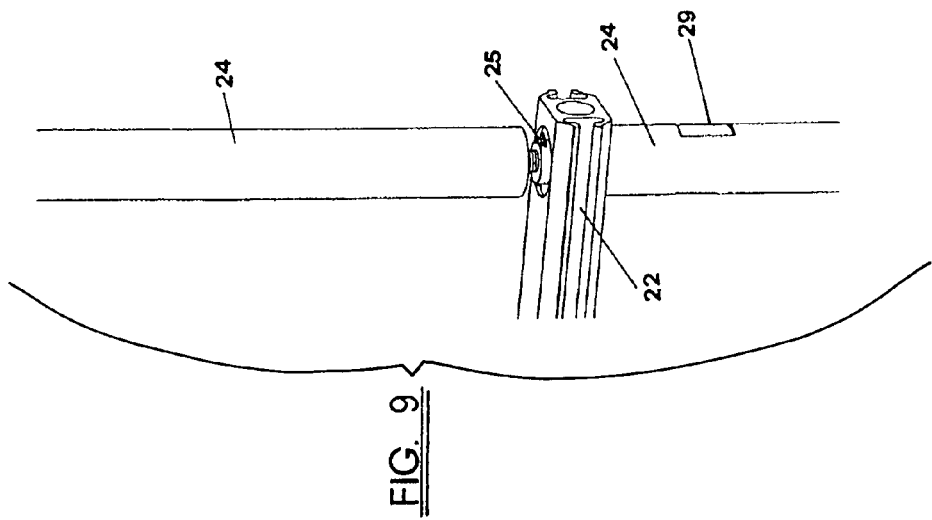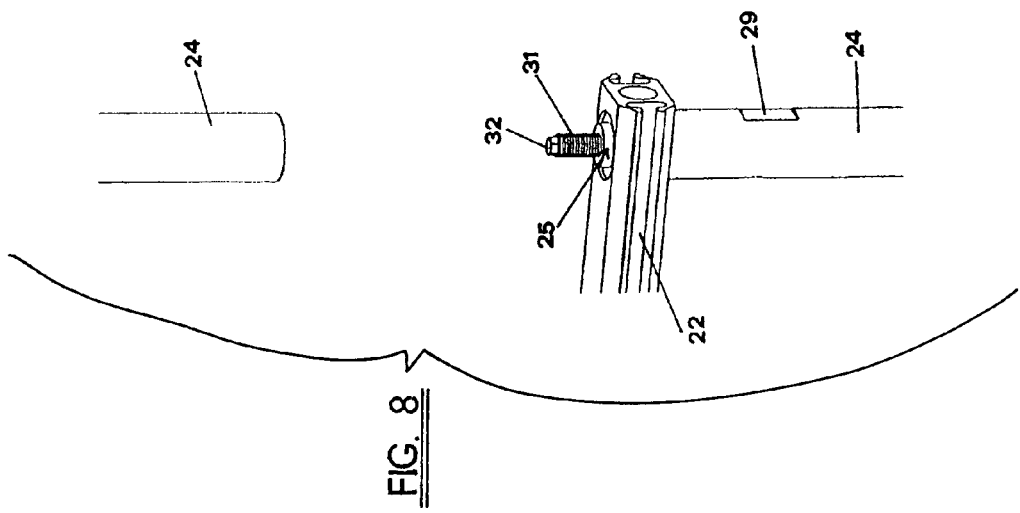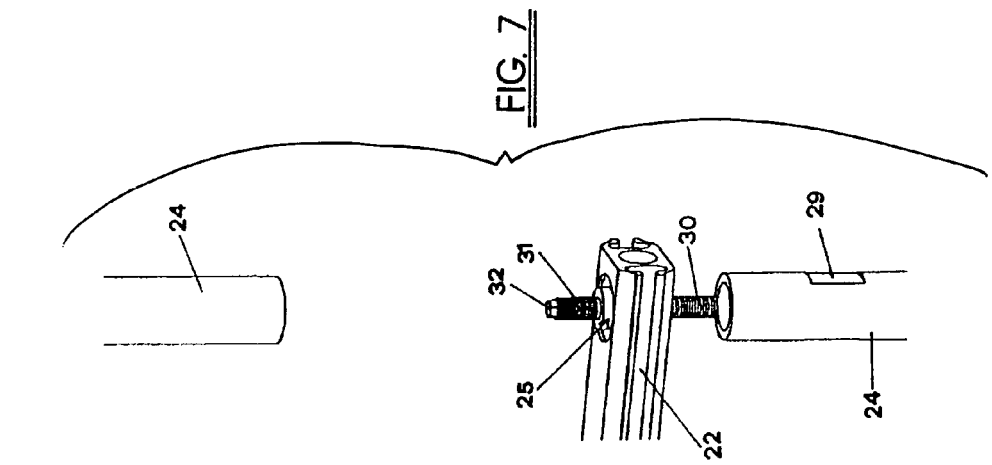

US 7,386,960 B2

MODULAR STRUCTURE FOR MODULAR PARTITION WALLS FORMED OF JUXTAPOSED PANELS

BACKGROUND OF THE INVENTION

The present invention generally relates to the field of office furnishings and, in particular, to construction of sectional partition walls consisting of juxtaposed panels of a kind used in offices for a purpose of dividing and defining an office space into independent zones.

DESCRIPTION OF THE PRIOR ART

According to known art, construction of partitions of the aforementioned kind generally makes use of a supporting structure comprising interconnected uprights and cross members which rest on a floor of a space to be furnished, and act as support for panels in order to frame the same within the uprights and the cross members of the supporting structure. The panels are made from wooden, synthetic or composites materials or the like, and may exhibit a covering made of an aesthetically pleasing material.

Such a construction has, however, some disadvantages which limit applicability thereof, unless provision is made for relatively expensive measures. As a matter of fact, with a supporting structure made according to the known art of the kind described above by assembly of uprights and cross members, a variety of available measures for partitions to be erected is limited, because both the uprights and the cross members are generally produced with a limited number of measures. Moreover, a conventional supporting structure exhibits a serious disadvantage in that its rigidity tends to decrease when dimensions of walls to be erected exceed certain limits, and this sets a more stringent restriction to measures of walls which can be erected.

SUMMARY OF THE INVENTION

The present invention is aimed at obviating the above-mentioned disadvantages of conventional supporting structures for partition walls, and provides a novel modular supporting structure for sectional partition walls consisting of juxtaposed panels.

According to the present invention, the modular supporting structure is intended to support juxtaposed panels in order to form a modular partition wall adapted to subdivide and define a space to be used as an office into independent working zones, and comprises a lower cross member, a plurality of intermediate cross members, an upper cross member and a plurality of upright spacers, with each upright spacer interconnecting a pair of adjacently arranged cross members. Only one joining element is provided for interconnection of each of the intermediate cross members to a pair of lower and upper upright spacers, respectively, at their point of concurrence, in order to form a supporting structure consisting of a framework of rectangular elementary cells intended to frame juxtaposed panels.

BRIEF DESCRIPTION OF THE DRAWINGS

The invention will now be described in more detail in relation to a preferred embodiment thereof, illustrated by way of example only and not limited thereto, illustrated in the accompanying drawings, wherein:

FIG. 1 is an isometric projection view of a sectional partition wall member formed of juxtaposed panels and made with a modular supporting structure according to the present invention;

FIG. 2 is an isometric projection view of the modular supporting structure in an assembled condition;

FIGS. 6 through 9 show various assembling steps for forming of the modular supporting structure according to the invention.

DESCRIPTION OF THE PREFERRED EMBODIMENT

Figure 4:
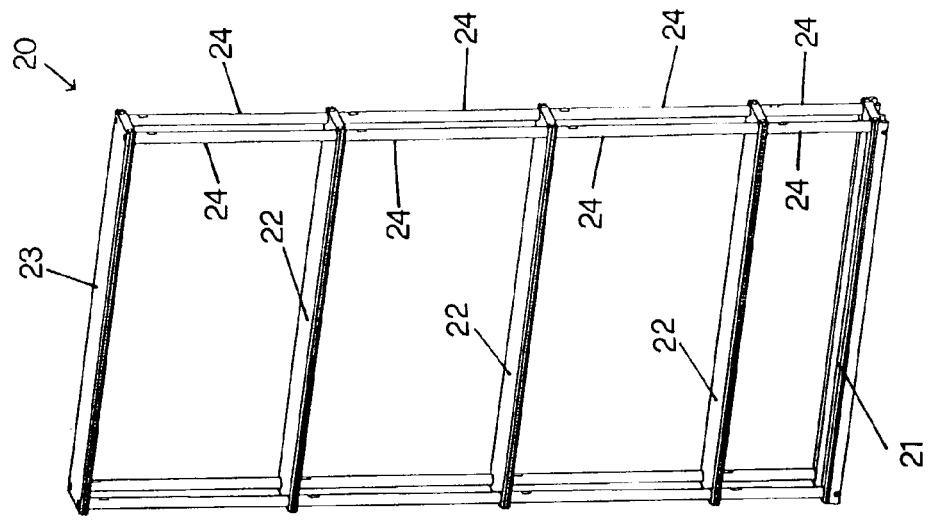
FIG. 4 is an isometric projection view of a modular supporting structure similar to that illustrated in FIG. 2, but having a different width.

FIG. 1 of the drawings illustrates a sectional partition wall member 10 intended to be joined together with other similar members, not shown in the Figure, in order to form a wall adapted to subdivide an interior space to be used as an office according to specific functional and aesthetical criteria. Such a partition wall member is formed in a manner known per se, by juxtaposing several decorative panels 11.

For supporting the panels 11 of the sectional partition wall member 10, according to this invention, there is provided an improved modular supporting structure, generally designated by 20 in FIG. 2. This supporting structure 20 comprises a lower cross member 21, one or more intermediate cross members 22, an upper cross member 23 and a plurality of upright spacers 24. The lower cross member 21, the intermediate cross members 22, the upper cross member 23 and the upright spacers 24 are joined together at their point of concurrence in a manner which will be described hereunder, in order to form a framework intended to frame the juxtaposed decorative panels 11 which form the modular partition wall member 10. By virtue of the fact that the cross members 21, 22, 23 and the spacers 24 are joined together in order to form a framework consisting of a plurality of rectangular elementary cells having measures which are independent from overall dimensions of the sectional partition wall member 10, the modular supporting structure 20 of the present invention exhibits a greater rigidity than known supporting structures for forming sectional partition walls.

Figure 3:
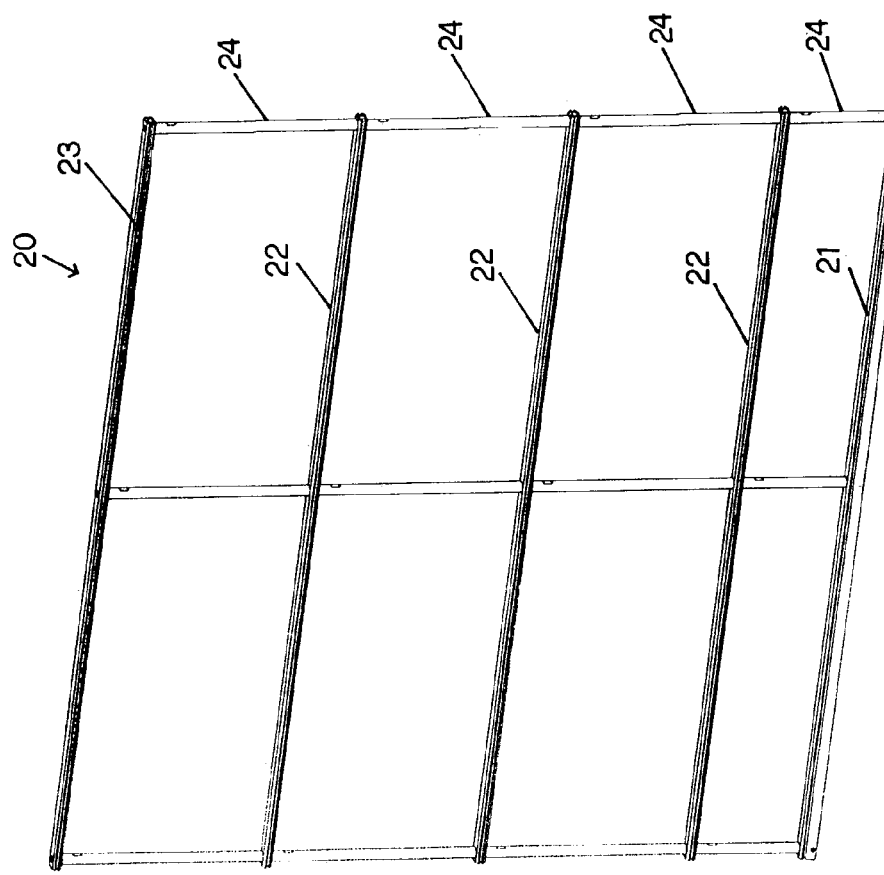
FIG. 3 is an isometric projection view of a modular supporting structure similar to that illustrated in FIG. 2, but having a different length.

With reference to FIGS. 3 and 4 of the drawings, there are illustrated two possible variants of the modular supporting structure 20 in accordance with the present invention. By observing these variants, one can see that they differ in that a length and width of the cross members 21, 22, 23 and a number of spacers 24 are different. It is possible to erect supporting structures of different dimensions by suitably choosing a length and width of the cross members and a number of spacers while maintaining unchanged, however, characteristics of rigidity of the supporting structure which are given by interconnecting of the cross members and the spacers to form a plurality of rectangular elementary cells.

Figure 5B:
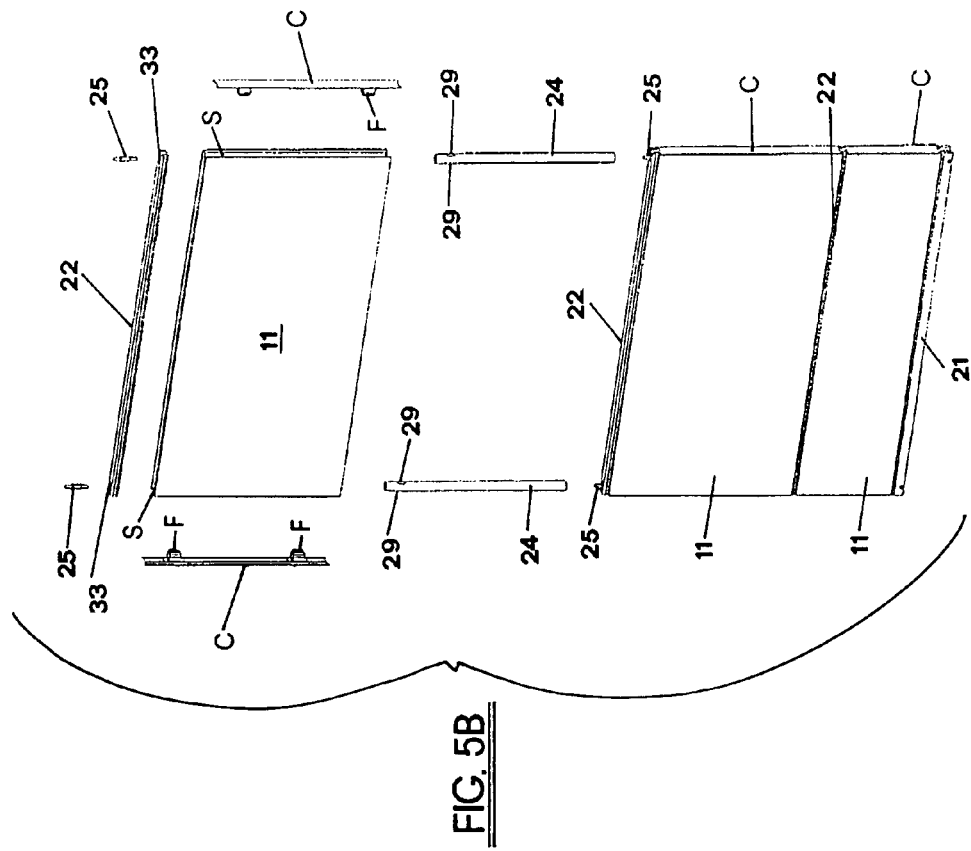
FIG. 5B is an isometric projection view of a portion of the modular supporting structure of FIG. 2 during assembly of partition wall forming panels.
Figure 5A:
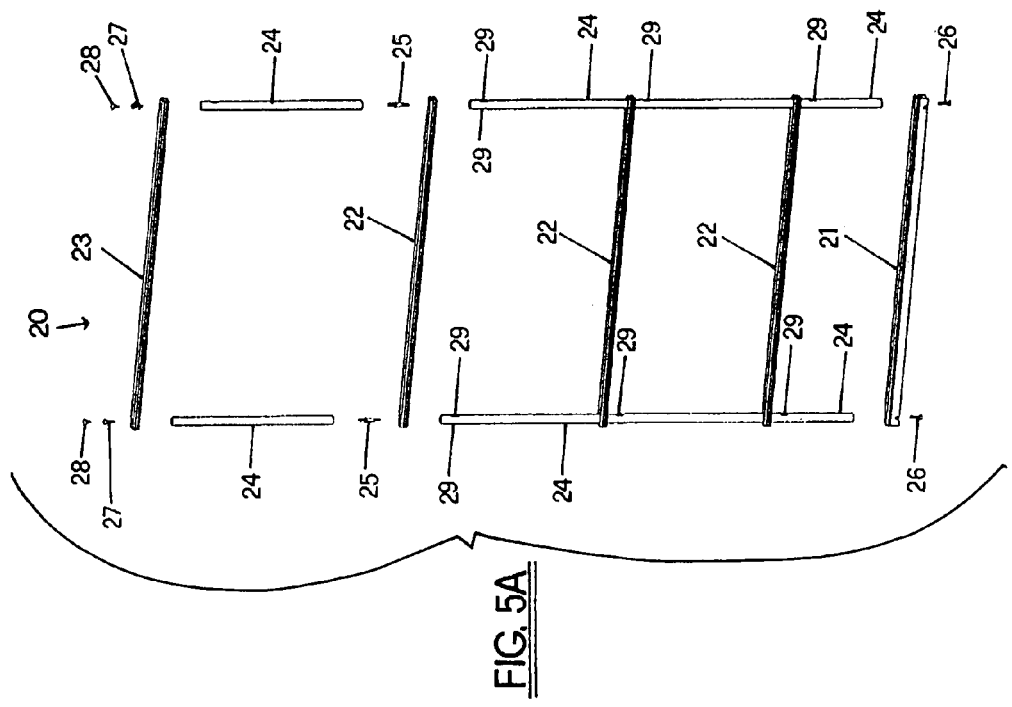
FIG. 5A is an isometric projection view of the modular supporting structure of FIG. 2, shown with its components in a partially disassembled condition.

In FIG. 5A of the drawings, there is shown an arrangement by which the lower cross member 21, the intermediate cross members 22, the upper cross member 23, and the upright spacers 24 are joined together to form the modular supporting structure 20 shown in FIG. 2. For a better understanding of the means by which the interconnection of the cross members and the spacers is realized, an illustration of the decorative panels 11 forming the partition wall member 10 has been omitted. For interconnection of the intermediate cross members 22 and the upright spacers 24 a special joining element, generally designated by 25, is used, whereas for interconnection of the lower cross member 21 and the upper cross member 23 to the upright spacers 24 ordinary connection elements, e.g. screws, are used which are generally indicated as 26 and 27, respectively.

FIG. 5B illustrates an arrangement by which the decorative panels 11 are joined together with the lower cross member 21, the intermediate cross members 22, the upper cross member 23 and the spacers 24 to form the sectional partition wall member 10. As can be seen, in smaller vertical sides of each decorative panel 11 a groove S is formed which extends throughout a length of each smaller vertical side of the decorative panel and is intended to receive therein an upright spacer 24. The groove S is then closed by a covering element C which is fixed to the upright spacer 24, for example by virtue of a snap clip F, so that the upright spacer 24 is concealed from view.

With reference to FIGS. 6 to 9 of the drawings, there is shown in greater detail the joining element 25. This joining element 25 is substantially formed by a smooth circular cylindrical shank 25A having a flange-forming enlargement 25B and a pair of threaded end portions 30, 31 extending from a lower portion and an upper portion of the shank 25A, respectively. A free end of the threaded end portion 31 terminates in a hexagonal head portion 32 in order to permit it to be operated via use of a tool as described in the following.

Again in FIGS. 6 to 9, it can be seen that the cross members 22 are provided with a through hole 33 at each end thereof which is intended to receive the shank 25A of the joining element 25. Upper and lower openings of the hole 33 are located in a depressed surface 34 provided on upper and lower sides of the intermediate cross member 22. This depressed surface 34 acts as an abutment surface for the flange 25B of the joining element 25, thus permitting the shank 25A of the joining element 25 to be retained inside the hole 33 so that lower and upper threaded end portions 30, 31 project from upper and lower sides, respectively, of free ends of the cross member 22. Since the shank 25A of the joining element 25 is smooth, the joining element 25 is lodged in the hole 33 with a possibility to turn around its longitudinal axis. Depressed surfaces 34 further act as abutment surfaces for end portion of the upright spacers 24 connected to associated intermediate cross members 22. A similar depressed surface 34 is also provided in an upper side of the lower cross member 21 and in a lower side of the upper cross member 23 at free ends thereof, in order to act as abutment surfaces for end portions of the upright spacers 24 connected to the cross members 21, 23.

Each upright spacer 24 is provided with a threaded hole at both its lower and the upper end portions, which are adapted to receive the lower and upper threaded end portions 30, 31, respectively, of the joining element 25. Moreover, on an outer surface at an upper end portion of each upright spacer a pair of oppositely arranged planar surfaces 29 are formed which are adapted to be operated via use of a suitable tool as described in the following.

Assembly of the modular supporting structure 20 and the decorative panels 11 forming the sectional partition wall member 10 is performed in the following steps.

Figure 6:
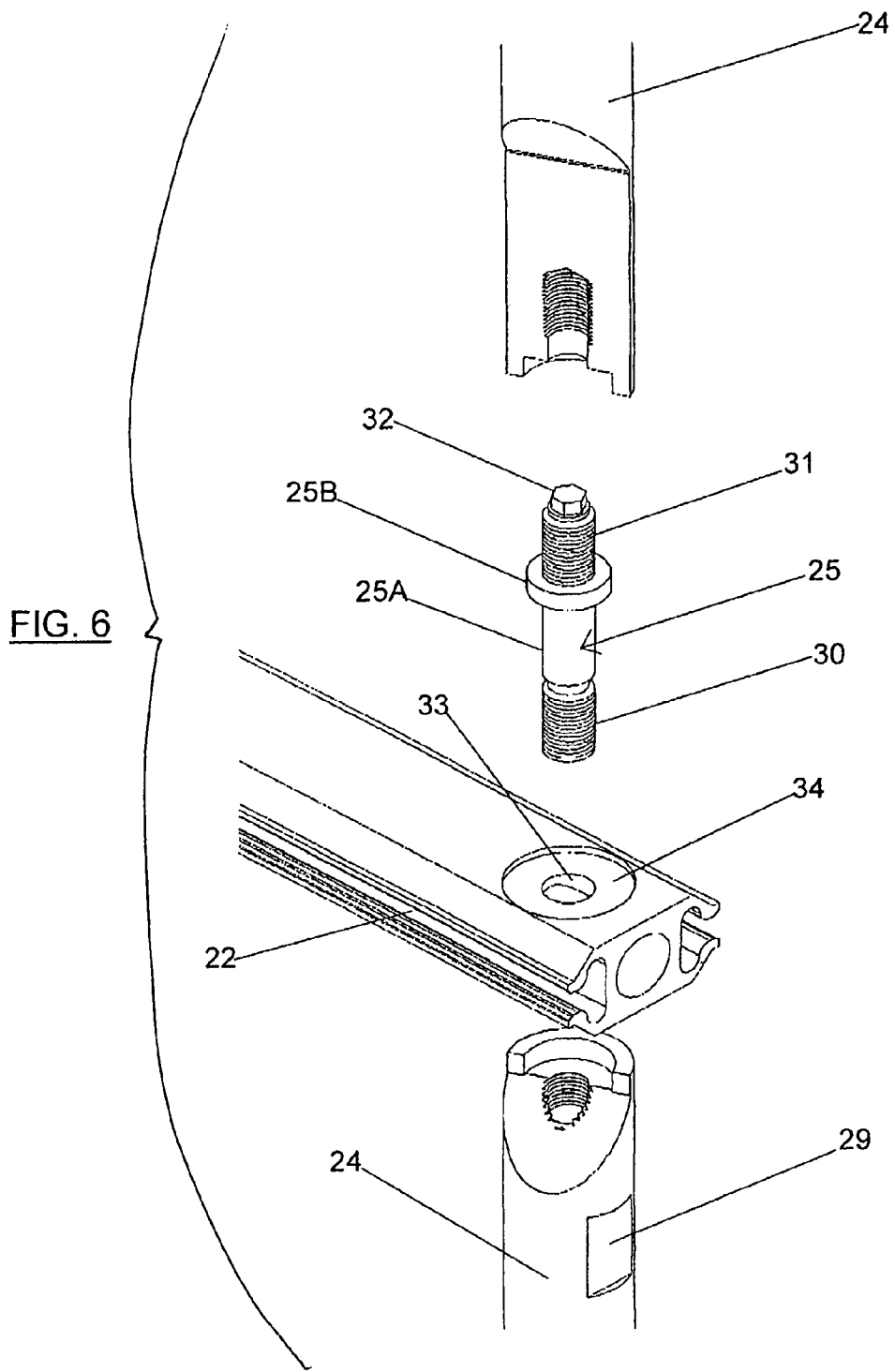

In a first step, a first pair of joining elements 25 is inserted from the top into the holes 33 made in the free ends of a first intermediate cross member 22 until the flange 25B of the shank 25A of each joining element 25 comes to a rest against the depressed abutment surface 34 surrounding the upper opening of the holes 33, as shown in FIGS. 6 and 7 of the drawings. In this condition, the lower and the upper threaded end portions 30 and 31, respectively, of the first pair of joining elements 25 project from the lower and the upper openings, respectively, of the holes 33 in the free ends of the intermediate cross member 22 so that a pair of lower and upper upright spacers 24 can be connected thereto.

In a second step, a pair of lower upright spacers 24 is connected to the lower threaded end portions 30 of the first pair of joining elements 25 assembled on the first intermediate cross member 22 via use of a suitable tool, by acting on the hexagonal head portion 32 of each upper threaded end portion 31 of the first pair of joining elements 25 as shown in FIGS. 7 and 8.

In a third step, a pair of upper upright spacers 24 is joined to the upper threaded end portions 31 of the first pair of joining elements 25 assembled on the first intermediate cross member 22 via use of a suitable tool, by acting on the oppositely arranged planar surfaces 29 of each upright spacer 24 as shown in FIG. 9.

In a fourth step, a first decorative panel 11 is inserted between the pair of upper upright spacers 24 connected to the first intermediate cross member 22, by passing the upper pair of upright spacers 24 within the corresponding grooves S in the smaller vertical sides of the first decorative panel 11, and then the grooves S are closed by applying the covering elements C to the upright spacers 24, so as to conceal the spacers from view.

In a fifth step, a second intermediate cross member 22 is connected to the upper pair of upright spacers 24 which have been previously connected to the first intermediate cross member 22 by inserting a second pair of joining elements 25 into the holes 33 in the free ends of the second intermediate cross member 22 and by screwing the lower threaded end portions 30 of each joining element 25 into the holes provided in these upright spacers 24, in order to connect the second intermediate cross member 22 to this pair of upright spacers 24, and thus frame the first decorative panel 11.

Thereafter, the operation described in the third, fourth and fifth steps, respectively, is repeated for all other intermediate cross members 22 concerned.

In a sixth step, a lower decorative panel 11 is inserted between the lower pair of upright spacers 24 which are connected to a lowest intermediate cross member 22 and the lower cross member 21 is connected to the pair of lower upright spacers 24 by the screws 26, so as to frame the decorative panel 11 which is at a base of the sectional partition wall member 10.

In a seventh and last step, an upper decorative panel 11 is inserted between the upper pair of upright spacers 24 which are connected to a highest intermediate cross member 22, and the upper cross member 23 is connected to this upper pair of upright spacers 24 by the screws 27, and then screw caps 28 are applied thereon, so as to conceal the screws from view. Thus, the decorative panel 11 at the top of the sectional partition wall member 10 is also framed.

From the foregoing it is apparent how the modular supporting structure in accordance with the present invention allows a sectional partition wall member of different, even comparatively big dimensions to be erected without prejudice to rigidity of the wall member, and this is achieved in a comparatively simple and economic way, since all decorative panels forming such wall member are framed by cross members and spacers fixedly connected together to form a framework of rectangular elementary cells.

What is claimed is:

1. A modular supporting structure for supporting at least one panel so as to form a sectional partition wall adapted to subdivide and define a space to be used as an office into independent working zones, comprising:
   intermediate cross members;
   upright spacers; and
   joining elements, each of said joining elements having
   (i) a first threaded end portion,
   (ii) a second threaded end portion,
   (iii) a flange-forming enlargement between said first and second threaded end portions, and
   (iv) a head portion, at an end of said first threaded end portion, constructed and arranged to be engaged by a torque-applying tool,
   wherein adjacent ones of said intermediate cross members are interconnected by two of said upright spacers so as to form a framework of at least one elementary cell intended to frame at least one panel, with each of said intermediate cross members at each end thereof being connected to upper and lower ones of said upright spacers via only one of said joining elements.

2. The modular supporting structure according to claim 1, further comprising:
   a lower cross member; and
   an upper cross member.

3. The modular supporting structure according to claim 2, wherein
   said each of said joining elements further has an intermediate circular cylindrical shank, with said flange forming enlargement extending from said intermediate circular cylindrical shank.

4. The modular supporting structure according to claim 3, wherein
   the framework of at least one elementary cell comprises a framework of plural rectangular elementary cells intended to frame plural juxtaposed panels.

5. The modular supporting structure according to claim 4, wherein
   said each of said intermediate cross members has at said each end thereof
   (i) a through hole,
   (ii) a first depressed surface surrounding a first end of said through hole, and
   (iii) a second depressed surface surrounding a second end of said through hole,
   with said intermediate circular cylindrical shank of a corresponding one of said joining elements being received within said through hole.

6. The modular supporting structure according to claim 5, wherein
   said flange-forming enlargement of said corresponding one of said joining elements abuts said first depressed surface such that said first threaded end portion of said corresponding one of said joining elements projects from said first end of said through hole and said second threaded end portion of said corresponding one of said joining elements projects from said second end of said through hole, and
   said each of said intermediate cross members at said each end thereof is connected to said upper and lower ones of said upright spacers via only one of said joining elements by having said first threaded end portion be connected to one of said upper and lower ones of said upright spacers and said second threaded end portion be connected to the other of said upper and lower ones of said upright spacers.

7. The modular supporting structure according to claim 4, wherein
   each of said upright spacers is designed to be received within a groove provided in sides of the juxtaposed panels.

8. The modular supporting structure according to claim 7, further comprising:
   covering elements including snap-fastening structure to be attached to said each of said upright spacers, respectively, so as to conceal said each of said upright spacers from view when received within corresponding grooves in the sides of the juxtaposed panels.

9. The modular supporting structure according to claim 4, wherein
   said lower cross member has a through hole at each end thereof, with said lower one of said upright spacers at said each end of a corresponding said each of said intermediate cross members being connected to said each end of said lower cross member via a screw passing through a corresponding said through hole.

10. The modular supporting structure according to claim 4, wherein
    said upper cross member has a through hole at each end thereof, with said upper one of said upright spacers at said each end of a corresponding said each of said intermediate cross members being connected to said each end of said upper cross member via a screw passing through a corresponding said through hole,
    and further comprising a covering element for concealing each said screw from view.

11. The modular supporting structure according to claim 1, wherein
    each of said upright spacers has a threaded hole at each end thereof, and
    said each of said intermediate cross members at said each end thereof is connected to said upper and lower ones of said upright spacers via only one of said joining elements by having said first threaded end portion be received within said threaded hole at one end of one of said upper and lower ones of said upright spacers and said second threaded end portion be received within said threaded hole at one end of the other of said upper and lower ones of said upright spacers.

12. The modular supporting structure according to claim 11, wherein
    said head portion comprises a hexagonal head portion,
    such that said second threaded end portion is received within said threaded hole at said one end of said other of said upper and lower ones of said upright spacers by using the torque-applying tool to grip said hexagonal head portion of said one of said joining elements and then rotating said one of said joining elements and said other of said upper and lower ones of said upright spacers relative to one another so as to screw said second threaded end portion into said threaded hole.

13. The modular supporting structure according to claim 11, wherein
    said each of said upright spacers has a pair of oppositely arranged planar surfaces on an outer surface thereof,
    such that said first threaded end portion is received within said threaded hole at said one end of said one of said upper and lower ones of said upright spacers by using a tool to grip said pair of oppositely arranged planar surfaces of said other of said upper and lower ones of said upright spacers and then rotating said one of said upper and lower ones of said upright spacers and said one of said joining elements relative to one another so as to screw said first threaded end portion into said threaded hole.

14. The modular supporting structure according to claim 13, wherein
said pair of oppositely arranged planar surfaces is adjacent said one end of a corresponding said other of said upper and lower directed ones of said upright spacers.

15. A kit for constructing a modular supporting structure that is to support at least one panel so as to form a sectional partition wall adapted to subdivide and define a space to be used as an office into independent working zones, comprising:
intermediate cross members;
upright spacers; and
joining elements, each of said joining elements having
  (i) a first threaded end portion,
  (ii) a second threaded end portion,
  (iii) a flange-forming enlargement between said first and second threaded end portions, and
  (iv) a head portion, at an end of said first threaded end portion, constructed and arranged to be engaged by a torque-applying tool,
wherein adjacent ones of said intermediate cross members are to be interconnected by two of said upright spacers so as to form a framework of at least one elementary cell intended to frame at least one panel, with each of said intermediate cross members at each end thereof to be connected to upper and lower ones of said upright spacers via only one of said joining elements.

16. The kit according to claim 15, further comprising:
a lower cross member; and
an upper cross member.

17. The kit according to claim 16, wherein
said lower cross member has a through hole at each end thereof, with said each end of said lower cross member to be connected to one of said upright spacers that is to correspond to the lower one of said upright spacers, at said each end of a corresponding said each of said intermediate cross members, via a screw passing through a corresponding said through hole.

18. The kit according to claim 16, wherein
said upper cross member has a through hole at each end thereof, with said each end of said upper cross member to be connected to one of said upright spacers that is to correspond to the upper one of said upright spacers, at said each end of a corresponding said each of said intermediate cross members, via a screw passing through a corresponding said through hole,
and further comprising a covering element for concealing each said screw from view when received within a corresponding said through hole.

19. The kit according to claim 15, wherein
said each of said joining elements further has
  an intermediate circular cylindrical shank, with said flange-forming enlargement extending from said circular cylindrical shank.

20. The modular supporting structure according to claim 19, wherein
said each of said intermediate cross members has at said each end thereof
  (i) a through hole,
  (ii) a first depressed surface surrounding a first end of said through hole, and
  (iii) a second depressed surface surrounding a second end of said through hole,
with said intermediate circular cylindrical shank of a corresponding one of said joining elements to be received within said through hole.

21. The kit according to claim 20, wherein
said flange-forming enlargement of said corresponding one of said joining elements is to abut said first depressed surface, when said corresponding one of said joining elements is received within said through hole, such that said first threaded end portion of said corresponding one of said joining elements projects from said first end of said through hole and said second threaded end portion of said corresponding one of said joining elements projects from said second end of said through hole, and
said each of said intermediate cross members at said each end thereof is to be connected to the upper and lower ones of said upright spacers via only one of said joining elements by having said first threaded end section be connected to one of the upper and lower ones of said upright spacers and said second threaded end section be connected to the other of the upper and lower ones of said upright spacers.

22. The kit according to claim 15, wherein
each of said upright spacers has a threaded hole at each end thereof, and
said each of said intermediate cross members at said each end thereof is to be connected to the upper and lower ones of said upright spacers via only one of said joining elements by having said first threaded end portion be received within said threaded hole at one end of one of the upper and lower ones of said upright spacers and said second threaded end portion be received within said threaded hole at one end of the other of the upper and lower ones of said upright spacers.

23. The kit according to claim 22, wherein
said head portion comprises a hexagonal head portion,
such that said second threaded end portion is to be received within said threaded hole at said one end of the other of the upper and lower ones of said upright spacers by using the torque-applying tool to grip said hexagonal head portion of the one of said joining elements and then rotating the one of said joining elements and the other of the upper and lower ones of said upright spacers relative to one another so as to screw said second threaded end section into said threaded hole.

24. The kit according to claim 22, wherein
said each of said upright spacers has a pair of oppositely arranged planar surfaces on an outer surface thereof,
such that said first threaded end portion is to be received within said threaded hole at said one end of the one of the upper and lower ones of said upright spacers by using a tool to grip said pair of oppositely arranged planar surfaces of the other of the upper and lower ones of said upright spacers and then rotating the one of the upper and lower ones of said upright spacers and the one of said joining elements relative to one another so as to screw said first threaded end portion into said threaded hole.

25. The kit according to claim 24, wherein
said pair of oppositely arranged planar surfaces is adjacent an end portion of said each of said upright spacers that is to receive said second threaded end portion of a corresponding one of said joining elements.

26. The kit according to claim 15, wherein adjacent ones of said intermediate cross members are to be interconnected by two of said upright spacers such that the framework of at least one elementary cell comprises a framework of plural rectangular elementary cells intended to frame plural juxtaposed panels.

27. The kit according to claim 15, wherein
each of said upright spacers is designed to be received within a groove provided in sides of the at least one panel.

28. The kit according to claim 27, further comprising:
covering elements including snap-fastening structure to be attached to said each of said upright spacers, respectively, so as to conceal said each of said upright spacers from view when received within corresponding grooves in the sides of the at least one panel.

\* \* \* \* \*